March 31, 1964 T. M. SCHURINGA ETAL 3,127,519

SWITCHING MATRICES WITH PROTECTION AGAINST SHORT-CIRCUIT IN THE GATES AT THE CROSSINGS

Filed April 3, 1961 2 Sheets-Sheet 1

INVENTOR
TJAKKO M. SCHURINGA
WILLEM SMIT.
BY
Frank R. Trifari
AGENT

INVENTOR
TJAKKO M. SCHURINGA
WILLEM SMIT.
BY
Frank R. Trifari
AGENT

United States Patent Office 3,127,519
Patented Mar. 31, 1964

3,127,519
SWITCHING MATRICES WITH PROTECTION AGAINST SHORT-CIRCUIT IN THE GATES AT THE CROSSINGS

Tjakko Marinus Schuringa and Willem Smit, Hilversum, Netherlands, assignors to North American Philips Company, Inc., New York, N.Y., a corporation of Delaware Filed Apr. 3, 1961, Ser. No. 100,205
Claims priority, application Netherlands Apr. 13, 1960
4 Claims. (Cl. 307—88)

This invention relates to a switching matrix with protection against short-circuit in gates at the crossings of the matrix. The gates are normally closed, and no more than one gate in each column and row may be momentarily opened periodically at a given instant ($t_1$) of a pulse cycle. Each input of the matrix is connected to a first point of constant potential through a normally closed gate controlled by an information source, and the terminals of the gates at the crossings of the matrix which are not connected to the normally closed gate are connected through operating circuits to a second point of constant potential having a different potential than the first point. As a rule, an input of the matrix is connected to no more than one output by way of a gate at a crossing of the matrix, so that an input cannot be simultaneously connected to more than one load. Such a switching matrix may be employed, for example, in an automatic telegraph exchange in which the information is transmitted in the form of code groups, the code elements of which occur at a given instant, for example the instant $t_1$, of a pulse cycle. As will be explained more fully hereinafter with reference to an example, a short-circuit in one of the gates at the crossings of the matrix may result in a serious disturbance in the operation of the telegraph exchange, so that a protection against this kind of interference is highly desirable. However, an object of the invention is not only to provide a safety circuit against this kind of interference, but also to make the safety circuit substantially self-checking, which is to be understood to mean that faults in the safety circuit itself are also indicated so that such faults do not interfere with the operation of the exchange. The invention is characterized in that the circuit includes a storing pulse generator, the setting winding of which is connected at one end, through a first controllable gate, to a point of the one constant potential and at its other end, through a second controllable gate, to a point of the other constant potential. The circuit is arranged so that there is a first current path through the first controllable gate, the setting winding of the pulse generator and a second current path through the gate controlled by the information source, the setting winding of the pulse generator and the second controllable gate. The two controllable gates are momentarily opened simultaneously at a given instant ($t_7$) of the pulse cycles and, in addition, each of these gates are opened individually at two other instants of the pulse cycles, the pulse generator being fired at instants of the pulse cycles located between the said instants.

In order that the invention may be readily carried into effect, it will now be described in detail, by way of example, with reference to the accompanying diagrammatic drawings, in which.

Figure 1:
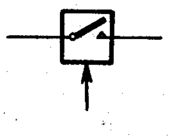
FIGURES 1, 2 and 3 show the symbols for several circuit elements which are employed in the circuit of the invention.
Figure 2:
Figure 3:
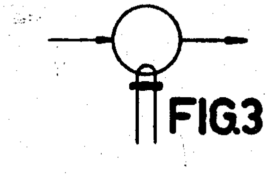

The symbol shown in FIGURE 1 is used to represent an electronic gate or an electro-mechanical gate. The gate may be designed so that it is normally closed (non-conducting) and is opened (conducting) in response to a control voltage. Alternatively, the gate may be designed so that it is normally open and is closed in response to a control voltage. FIGURE 2 shows the symbol for a pulse source delivering pulses of the strength $i$ at the moments $t_i$ and $t_j$ of a pulse cycle. FIGURE 3 shows the symbol for a storing pulse generator. This is to be understood to mean a circuit which delivers an output pulse only if a current pulse of a given polarity and strength is first applied to the so-called setting terminals which are represented by a transverse dash (the setting of the pulse generator) and subsequently a current pulse of a given polarity and strength is applied to the firing terminal which is indicated by an arrow directed towards a circle representing the pulse generator (the firing of the pulse generator). The output terminal of the pulse generator is represented by an arrow directed away from the said circle. Consequently, setting a pulse generator which is already in the set condition has no effect, nor does the firing of a pulse generator which has already been fired without being reset.

Figures 4, 5:
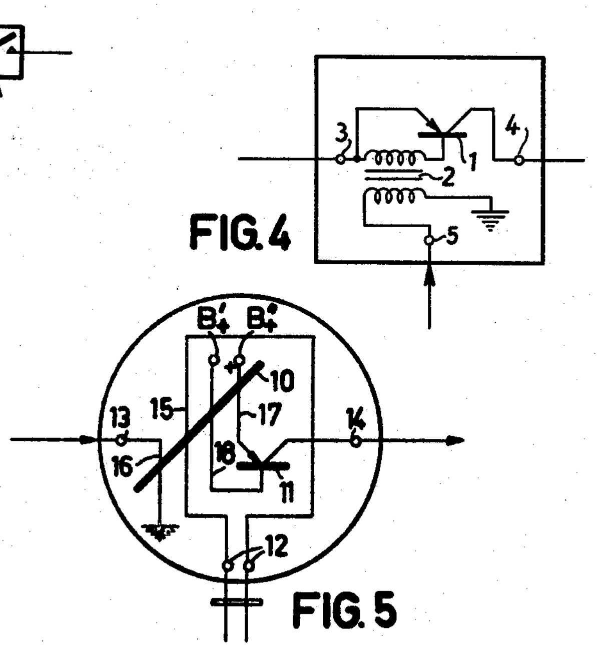
FIGURES 4 and 5 show embodiments of two such circuit elements.

FIGURE 4 shows an electronic gate circuit comprising a pnp-transistor 1, a transformer 2, an input terminal 3, an output terminal 4 and a control terminal 5. The transistor is normally nonconducting, that is to say, the gate is closed. However, when a pulse is applied to the control terminal 5, a voltage is induced in the secondary winding of transformer 2 which renders the base of the transistor negative relative to its emitter, so that the transistor becomes conducting, at least during a certain period, and hence the gate is opened. The time during which the gate is opened by a pulse depends upon the flop-over time of the core of the transformer. If necessary, the base of the transistor may be positively biased relative to the emitter. It is also possible on the same principle to build a gate which is normally open and which is momentarily closed by the action of a pulse.

FIGURE 5 shows a possible embodiment of a storing pulse generator, comprising a ring 10 of a material having a rectangular magnetic hysteresis loop, a pnp-transistor 11, setting terminals 12 connected to a setting winding 15 of the ring 10, a firing terminal 13 connected to a firing winding 16, and an output terminal 14 connected to the collector of transistor 11. The base of the transistor is connected through a control winding 18 to a positive voltage source $B'_+$ and its emiter is connected through a feedback winding 17 to a second positive voltage source $B''_+$ which has a voltage preferably a little lower than that of the first-mentioned voltage source. Thus, the transistor is normally nonconducting. The winding senses of the various windings, each of which may comprise a plurality of turns, can be seen from the manner in which the lines representing these windings intersect the thick line segment representing the ring. This circuit operates as follows. Let it be assumed that the ring 10 is in a magnetic condition referred to as the state 0. This is the non-set condition of the pulse generator. When a current pulse of sufficient strength is fed through the setting winding 15, the pulse generator is set, that is to say, the ring 10 assumes the magnetic state 1. Due to the flopping over of the ring 10, the base of the transistor is made positive more strongly than it was already, so that the transistor remains cut off. When a current pulse is now led through the firing winding, that is to say, when the pulse generator is fired, the ring begins to flop back to the state 0. The base of the transistor 10 thus becomes negative relative to its emitter and the transistor delivers an output current. This current flows almost completely through the feedback winding 17, so that the ring 10 is driven completely to the state 0, even if the firing pulse is already terminated before the ring has reached this state. In fact, in the latter case, the current through the feedback winding takes over completely the function of the current through the firing winding. By suitable proportioning of the generator the pulse which occurs by firing a set pulse generator may have a sharply defined duration and amplitude.

Figure 6:
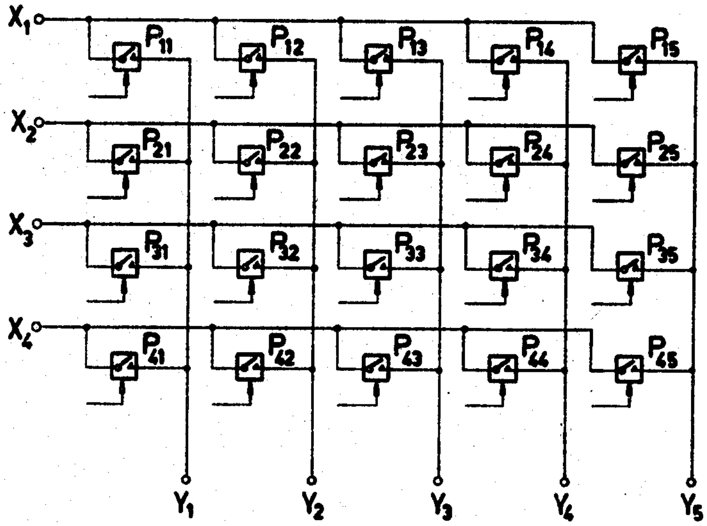
FIGURE 6 illustrates a switching matrix.

FIGURE 6 shows a switching matrix in which the present invention may be employed. This switching matrix has four inputs $x_1$, $x_2$, $x_3$, $x_4$ and five outputs $y_1$, $y_2$, $y_3$, $y_4$, $y_5$. The input $x_i$ ($i$=1, 2, 3, 4) is connected through a gate $P_{ij}$ to the output ($j$=1, 2, 3, 4, 5), so that each input may be connected to each output.

Let it be assumed that the switching matrix is included in a telegraph system in which the information is transmitted by means of pulse code-groups, the code elements of which are bivalent pulses occurring at the instant $t_1$ of every pulse cycle. The pulse code-groups may be transmitted either sequentially or in parallel. In the latter case, however, as many switching matrices are required as the pulse code-groups contain code elements, and the switching matrices must be controlled simultaneously and in phase. When the information is to be transmitted from the input $x_i$ to the output $y_j$, the gate $P_{ij}$ must be open at each instant $t_1$ for the duration of a pulse.

Two kinds of interference may occur in the switching matrix, namely:

(1) One of the gates $P_{ij}$ cannot be opened;
(2) One of the gates $P_{ij}$ has a short-circuit.

An interference of the first-mentioned kind produces the result that the relevant information cannot be transmitted to the output $y_j$ (in the case of sequential transmission), or is transmitted to the output $y_j$ with errors (in the case of parallel transmission). It is not the object of a circuit according to the invention to detect this kind of interference. This may be effected by means of a control circuit which delivers a control signal in the absence of transmission of information (in the case of sequential transmission) or a control circuit which controls the pulse code-groups with regard to errors. For this purpose the code employed is required to be self-controlling (in the case of parallel transmission). However, such circuits have no relationship with the invention.

An interference of the second kind may seriously interfere with the operation of the switching matrix. Let it be assumed, for example, that connections $x_1 \rightarrow y_3$ and $x_3 \rightarrow y_2$ are built up at a given moment, that is to say, at the instants $t_1$ of the pulse cycles the gates $P_{13}$ and $P_{32}$ each receive a control pulse opening these gates for the duration of a pulse. Assume also that the gate $P_{12}$ has a short circuit. In this case, the code elements applied to the input $x_1$ are passed not only through the gate $P_{13}$, which is periodically opened, to the output $y_3$, as desired, but also through the short-circuited gate $P_{12}$ to the output $y_2$. This output also receives through the gate $P_{32}$, which is periodically opened, the code elements which occur at the input $x_3$. These latter code elements are also passed, however, through the periodically-opened gate $P_{32}$, the short-circuited gate $P_{12}$ and the periodicaly-opened gate $P_{13}$ to the output $y_3$. Consequently, the code elements fed to the input $x_1$ and $x_3$ are completely mixed at the outputs $y_2$ and $y_3$. In order to avoid this risk, the supply of information to the input $x_1$ must be cut off and the gates $P_{11}$, $P_{13}$, $P_{14}$ and $P_{15}$ must be kept closed. The latter is only natural, since it is useless for these gates to be opened if no information is fed to the input $x_1$.

Figures 7, 8, 9:
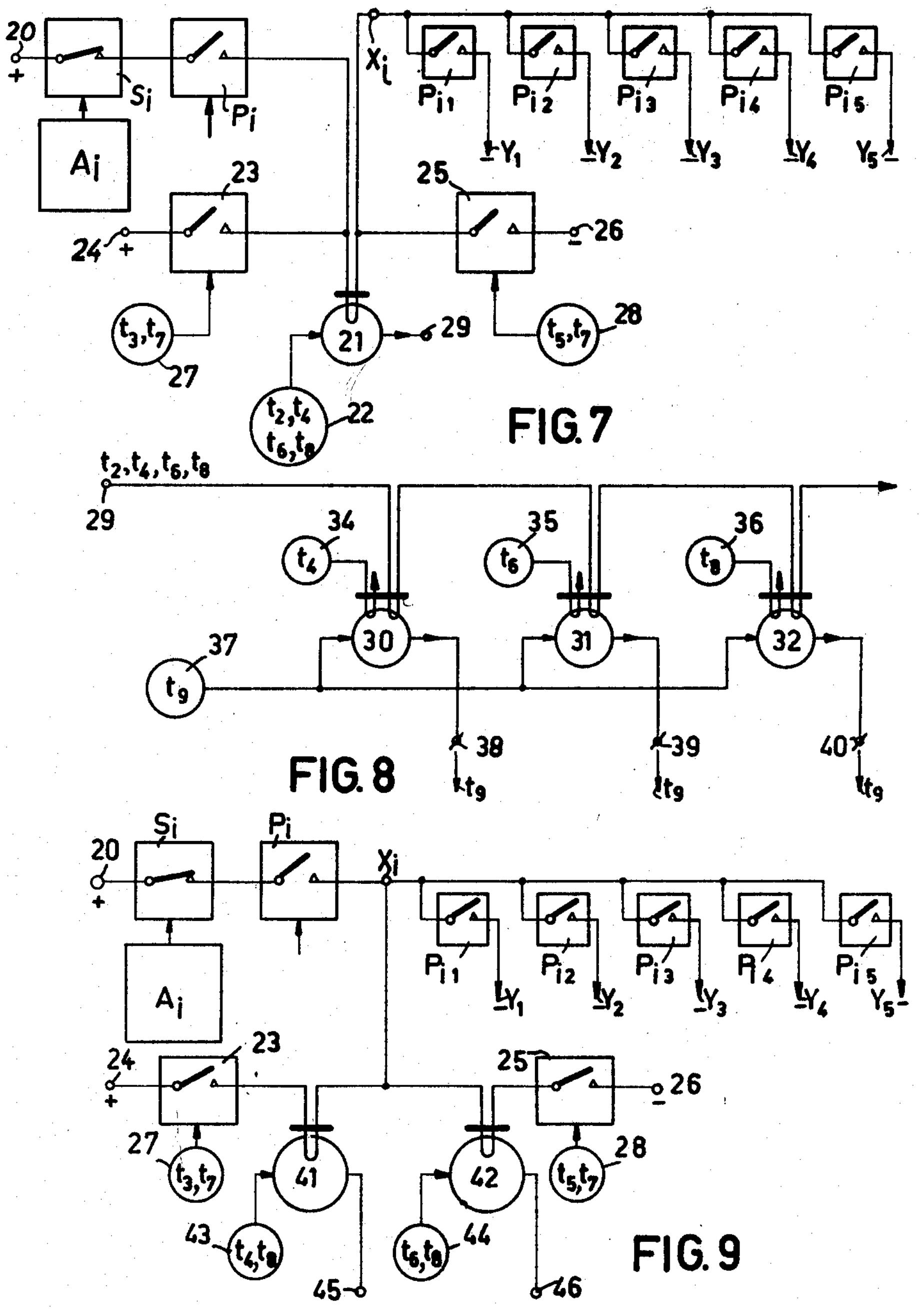
FIGURE 7 shows a first embodiment of the invention.
FIGURE 8 shows a circuit for separating pulses which occur at different instants of a pulse cycle.
FIGURE 9 shows a second embodiment of the invention.

FIGURE 7 shows an example of a circuit for protecting against short-circuit in one of the gates $P_{i1}$, $P_{i2}$, $P_{i3}$, $P_{i4}$, $P_{i5}$. The input $x_i$ is connected through the setting winding of a storing pulse generator 21, a gate $P_i$ controlled by the safety circuit in a manner which will be described in detail hereinafter, and gate $S_i$ controlled by the information source $A_i$ to a point 20 of positive potential. The gate $S_i$ is normally closed, but is opened for the duration of one pulse each time the information source $A_i$ supplies a code element of a value equal to unity. The code elements occur at the instant $t_1$ of the pulse cycles. The outputs $y_1$, $y_2$, $y_3$, $y_4$, $y_5$ are connected through load devices (not shown) to a point of negative potential. The firing terminal of a pulse generator 21 is connected to a pulse source 22 which delivers pulses at the instants $t_2$, $t_4$, $t_6$, $t_8$ of the pulse cycles. The setting terminal of the pulse generator 21, which is connected to the gate $P_i$, is also connected through a gate 23 to a point 24 of positive potential and the setting terminal of the pulse generator 21, which is connected to the multiple point $x_i$, is also connected through a gate 25 to a point 26 of negative potential. The gates 23 and 25 are normally closed. However, the gate 23 is momentarily opened at the instants $t_3$ and $t_7$ by means of pulses supplied by a pulse source 27 and the gate 25 is momentarily opened at the instants $t_5$ and $t_7$ by means of pulses supplied by a pulse source 28. The output of the pulses generator 21 is connected to a terminal 29.

The circuit operates as follows. At each instant $t_1$ the gate $P_i$ and the relevant gate $P_{ij}$ are momentarily opened (made conducting) to pass the code element supplied by the information source $A_i$. When this code element has the value 0, the pulse generator 21 is set through the path: point 20, gate $S_i$, gate $P_i$, setting winding of pulse generator 21, input $x_i$, gate $P_{ij}$, and the negative potential source at output $y_j$. At the next instant $t_2$ the pulse generator 21 is fired so that it repeats a negative image of the information delivered by the information source $A_i$ with a delay of one instant of the pulse cycle. The opening of the gate 23 at the instant $t_3$ has no effect, since all the gates $P_{ij}$ and the gate 25 are closed. The opening of the gate 25 at the instant $t_5$ also has no has effect, since the gate $P_i$ and the gate 23 are closed. However, when both gtaes 23 and 25 are opened at the instant $t_7$, the pulse generator 21 is set through the path: point 24, gate 23, setting winding of pulse generator 21, gate 25, point 26. The pulse generator 21 is fired at the instant $t_8$ and delivers a pulse. Thus, the pulse generator 21 delivers a pulse series with pulses which occur at the instant $t_8$ of the pulse cycles.

We shall now consider what happens if a fault is present, it being possible to distinguish between the following cases:

(1) One of the gates $S_i$, $P_i$ and $P_{ij}$ cannot be opened. As a result thereof, there is no transmission of information (in the case of sequential transmission) or the code elements are transmitted with error (in the case of parallel transmission). This fault is not detected by a safety circuit according to the invention, but may be determined in known manner by means of an other control circuit.

(2) The gate $P_{ij}$ has a short-circuit. At the instant $t_3$ of the first pulse cycle after the short-circuit has arisen, the pulse generator 21 is set through the path: point 24, gate 23, setting winding of pulse generator 21, input $x_i$, short-circuited gate $P_{ij}$, and the negative potential at output $y_j$. At the next instant $t_4$ the pulse generator 21 is fired and delivers a pulse. This pulse is employed in a manner (not shown) to keep the gate $P_i$ closed (conducting). Thus, the multiple point $x_i$ is isolated from point 20 and the short-circuit in the gate $P_{ij}$ does not interfere with the functions of the other inputs.

(3) The gate $S_i$ has a short-circuit. Now also there is no transmission of information, or the information is transmitted with distortion. Otherwise the same applies as has been said in Case No. 1 above.

(4) The gate $P_i$ has a short-circuit. At each instant $t_5$ the pulse generator 21 is set through the path: gate 20, point $S_i$, short-circuited gate $P_i$ setting winding of pulse generator 21, gate 25, point 26. At the instant $t_6$ of each pulse cycle the pulse generator 21 is fired and delivers a pulse which may be used to produce an alarm signal.

(5) The gate 23 or the gate 25 cannot be opened (made conducting). In this case the pulse generator 21 cannot be set at the instant $t_7$ and hence does not deliver pulses at the instant $t_8$ of the pulse cycles.

(6) The gate 23 has a short-circuit. At the instant $t_5$ of each pulse cycle the pulse generator 21 is set through the path: point 24, short-circuited gate 23, setting winding of pulse generator 21, gate 25 and point 26. At the instant $t_6$ of each pulse cycle the pulse generator 21 is fired and delivers a pulse which is used for giving an alarm signal.

(7) The gate 25 has a short-circuit. At the moment $t_3$ of each pulse cycle, the pulse generator 21 is set through the path: point 24, gate 23, setting winding of pulse generator 21, short-circuited gate 25, point 26. At the instant $t_4$ of each pulse cycle the pulse generator 21 is fired and delivers a pulse which is used for giving an alarm signal.

(8) The pulse generator 21 is defective. As a result thereof, it cannot deliver output pulses at the instants $t_8$ of the pulse cycles, or it delivers a direct current. This change in the normal signal (pulses at $t_8$) may be detected in known manner and converted into an alarm signal.

From the aforegoing it appears that the safety circuit may deliver the following kinds of signals:

(1) A pulse series with pulses at the instant $t_8$ of every pulse cycle or interruption of this pulse series.

(2) A pulse at the instant $t_4$ of a pulse cycle.

(3) A pulse at the instant $t_6$ of a pulse cycle.

(4) A direct current.

In order to signal the kind of the fault occurred, these signals must be separated. Distinguishing a direct current from pulses is not difficult and may be effected in known manner. FIGURE 8 shows a circuit for separating pulses at the instants $t_4$, $t_6$ and $t_8$. This circuit comprises three storing pulse generators 30, 31 and 32, each having two setting windings proportioned so that a pulse generator assumes the set condition only if a current pulse is passed through both its setting windings simultaneously (setting in coincidence). First setting windings of the three pulse generators 30, 31 and 32 are connected in series and connected to the output terminal 29 of the pulse generator 21 of FIGURE 7. The second setting winding of the pulse generator 30 is connected to a pulse source 34, that of the pulse generator 31 to a pulse source 35 and that of the pulse generator 32 to a pulse source 36. The pulse sources 34, 35 and 36 deliver pulses at the instants $t_4$, $t_6$ and $t_8$ respectively of the pulse cycles. The firing terminals of the pulse generators 30, 31 and 32 are connected to a pulse source 37 which delivers pulses at the instants $t_9$ of the pulse cycles. The outputs of the pulse generators 30, 31 and 32 are connected to terminals 38, 39 and 40.

This circuit operates as follows. Let it be assumed that it receives a pulse at the instant $t_6$. The pulse generator 31 is then set in coincidence and delivers a pulse at the instant $t_9$. Consequently, the outputs 38, 39 or 40 deliver an output pulse depending upon the occurrence of a pulse at the instants $t_4$, $t_6$ or $t_8$. The circuit does not respond to pulses at the instant $t_2$, but this is not necessary, since these pulses do not indicate a fault. The pulses delivered by the output 38 may be used for keeping the gate $P_i$ closed (nonconducting), but do not discriminate between a short-circuit in a gate $P_{ij}$ and a short-circuit in the gate 25.

FIGURE 9 shows a second embodiment of the invention. It differs from the embodiment shown in FIGURE 7 in that the storing pulse generator 21 is replaced by two storing pulse generators 41 and 42, the setting windings of which are connected in series, and the interconnected ends of these windings are also connected to the input $x_i$. The gate 23 is opened (conducting) again at the instants $t_3$ and $t_7$ by pulses supplied by the pulse source 27 and the gate 25 is opened at the instants $t_5$ and $t_7$ by pulses supplied by a pulse source 28. The pulse generator

41 is fired at the instants $t_4$ and $t_8$ by pulses supplied by a pulse source 43 and the pulse generator 42 is fired at the instants $t_6$ and $t_8$ by pulses supplied by a pulse source 44. The outputs of the pulse generators 41 and 42 are connected to terminals 45 and 46. After the foregoing description of the circuit shown in FIGURE 7, it is not difficult to appreciate how the circuit shown in FIGURE 9 operates, so that it may suffice to state here the results:

(1) No faults: the outlets 47 and 48 deliver the pulses $t_8$.

(2) One of the gates $S_i$, $P_i$, $P_{ij}$ cannot be opened or $S_i$ has a short-circuit: is not detected.

(3) Short-circuit in $P_{ij}$: pulse at $t_4$ across outlet 45.

(4) Short-circuit in $P_i$: pulse at $t_6$ across outlet 46.

(5) Short-circuit at 23: pulse at $t_6$ across outlet 46.

(6) Short-circuit in 25: pulse at $t_4$ across outlet 45 and pulse at $t_6$ across outlet 46.

(7) 23 or 25 is not opened: no pulses at $t_8$ across outlets 45 and 46.

(8) Pulse generator 41 is defective: no pulses at $t_8$ across outlet 45 or direct current across outlet 45.

(9) Pulse generator 42 is defective: no pulses at $t_8$ across outlet 46 or direct current across outlet 46.

The pulse across output 45 at the instant $t_4$ (short-circuit in $P_{ij}$ gate or gate 25) may be used, for closing the gate $P_i$.

It will otherwise be evident that, in the circuit shown in FIGURE 9, the pulse generator 41 and the gate 23 on the one hand, and the pulse generator 42 and the gate 25 on the other, may be interchanged.

What is claimed is:

1. A switching matrix comprising a plurality of input conductors and a plurality of output conductors defining a plurality of conductor crossings between separate input and output conductors, normally closed crossing gate means at each of said crossings, said crossing gate means being arranged to be selectively opened at first instants of a pulse cycle whereby any input conductor is connected to no more than one output conductor at said first instants, first and second points of different potential, means connecting said output conductors to said second point, storing pulse generator means having setting winding means, firing winding means, and output winding means, first, second and third normally closed gate means, means connecting said first point to one of said input conductors by way of said first gate means and connecting said first point to said second point by way of said first gate means, setting winding means, and third gate means, means connecting said first point to said one input conductor by way of said second gate means and setting winding means, a source of information signals connected to operate said first gate means, a source of pulses connected to open said second and third gate means simultaneously at one pulse instant and separately at other pulse instants of said pulse cycle, means connected to said firing winding means for firing said pulse generator means at instants of said pulse cycle other than said previously mentioned instants, and output circuit means connected to said output winding means.

2. The matrix of claim 1 comprising fourth gate means connected in series with said means for connecting said first point to one of said input conductors, and means for closing said fourth gate means in response to an output pulse from said output winding means when a current path is established from said first point to said second point by way of said second gate means, setting winding means, said one input conductor, and a crossing gate means.

3. A switching matrix comprising a plurality of input conductors and a plurality of output conductors defining a plurality of conductor crossings between separate input and output conductors, normally closed crossing gate means at each of said crossings, said crossing gate means being arranged to be selectively opened at first instants of a pulse cycle whereby any input conductor is connected to no more than one output conductor at said first instants, first and second points of different potential, means connecting said output conductors to said second point, storing pulse generator means having a setting winding, a firing winding and an output winding, first, second and third normally closed gate means, said setting winding having first and second terminals, means connecting said first gate means between said first point and said first terminal, means connecting said second gate between said first point and first terminal, means connecting said third gate between said second terminal and said second point, means connecting said second point to one of said input conductors, a source of information signals connected to operate said first gate means, a source of pulses, means for applying said pulses to said second and third gate means for momentarily opening said second and third gate means simultaneously at second instants of said pulse cycle and separately at third and fourth instants of said pulse cycle, means for connecting said source of pulses to said firing winding for applying firing pulses thereto at instants between said second, third and fourth instants and subsequent said fourth instant, and output circuit means connected to said output winding.

4. A switching matrix comprising a plurality of input conductors and a plurality of output conductors defining a plurality of conductor crossings between separate input and output conductors, normally closed crossing gate means at each of said crossings, said crossing gate means being arranged to be selectively opened at first instants of a pulse cycle whereby any input conductor is connected to no more than one output conductor at said first instants, first and second points of different potential, means connecting said output conductors to said second point, first and second storing pulse generators having first and second setting windings respectively, first and second firing windings respectively, and first and second output windings respectively, first, second and third normally closed gate means, means connecting said first gate means between said first point and one of said input conductors, means connecting said second gate means and first setting winding serially between said first point and said one conductor, means connecting said second setting winding and third gate means serially between said one conductor and said second point, a source of information signals connected to operate said first gate means, a source of pulse signals connected to said second and third gate means to open said second and third gate means simultaneously at a second instant and separately at third and fourth instants of said pulse cycles, means for connecting said pulse source to said first and second firing windings to apply pulses thereto subsequent the application of pulses to the respective serially connected gate means, and output circuit means connected to said first and second output windings.

References Cited in the file of this patent

UNITED STATES PATENTS

| | | |
|---|---|---|
| 2,969,469 | Richards | Jan. 24, 1961 |
| 2,991,373 | Morgan | July 4, 1961 |
| 2,994,789 | Gottfried | Aug. 1, 1961 |